(12) United States Patent
Pechoux et al.

(10) Patent No.: US 6,293,514 B1
(45) Date of Patent: Sep. 25, 2001

(54) FLOW REGULATION VALVE

(75) Inventors: Christophe Pechoux, Torcy; Claude Villermaux, Chatillon sous Bagneux, both of (FR)

(73) Assignee: A. Theobald SA (FR)

( * ) Notice: Subject to any disclaimer, the term of this patent is extended or adjusted under 35 U.S.C. 154(b) by 0 days.

(21) Appl. No.: 09/600,646
(22) PCT Filed: Jan. 21, 1999
(86) PCT No.: PCT/FR99/00118
  § 371 Date: Jul. 20, 2000
  § 102(e) Date: Jul. 20, 2000
(87) PCT Pub. No.: WO99/37943
  PCT Pub. Date: Jul. 29, 1999

(30) Foreign Application Priority Data

Jan. 21, 1998 (FR) .................................. 98 00593

(51) Int. Cl.[7] .................. F16K 1/52; F16K 31/06
(52) U.S. Cl. ............ 251/122; 137/625.3; 251/205; 251/54; 251/129.08; 251/129.19
(58) Field of Search ..................... 251/118, 120, 251/121, 122, 77, 84, 54, 205, 129.08, 129.19; 137/625.3

(56) References Cited

U.S. PATENT DOCUMENTS

| 2,014,314 | * | 9/1935 | Defenbaugh | 251/122 |
|---|---|---|---|---|
| 2,117,182 | * | 5/1938 | Lewis | 137/625.3 |
| 2,387,792 | * | 10/1945 | Holmes | 137/625.3 X |
| 2,541,176 | * | 2/1951 | Rockwell | 137/625.3 |
| 2,851,241 | * | 9/1958 | Wallgren | 251/121 |
| 3,108,777 | * | 10/1963 | Ray | 251/54 |
| 3,349,798 | * | 10/1967 | Allen | 137/625.3 X |
| 3,791,413 | * | 2/1974 | Muller et al. | 251/122 X |
| 3,955,759 | * | 5/1976 | Knapp | 137/625.3 X |
| 3,985,331 | * | 10/1976 | Riley et al. | 251/122 X |
| 4,458,718 | * | 7/1984 | Vick | 137/625.3 X |
| 5,238,222 | * | 8/1993 | Sumida et al. | 251/118 |
| 5,992,822 | * | 11/1999 | Nakao et al. | 251/129.19 X |

* cited by examiner

*Primary Examiner*—Kevin Shaver
*Assistant Examiner*—Eric Keasel
(74) *Attorney, Agent, or Firm*—Webb Ziesenheim Logsdon Orkin & Hanson, P.C.

(57) ABSTRACT

A valve including a cylindrical bore having a circular seat at one end thereof, a valve member that is movable in the axial direction of the seat, and control means connected to the valve member, the valve member including a first portion which serves as a closure element, and a second portion which is engaged in the bore and which is shaped to regulate the flow of the fluid at a desired rate depending on the axial position of the valve member, the second portion of the valve member is detached from the first portion and has a cylindrical outside surface of diameter such that it is in sliding contact with the cylindrical surface of the bore; at least one recess is formed in the cylindrical outside surface of the second portion of the valve member so as to define a passage having a predefined shape, and means is provided for permanently holding the two portions of the valve member in mutual contact so that they are displaced axially simultaneously under the action of the control means.

10 Claims, 4 Drawing Sheets

FLOW REGULATION VALVE

BACKGROUND OF THE INVENTION

1. Field of the Invention

The present invention relates to a valve for regulating the flow of a liquid or gaseous fluid, the valve being of the type including a body having an inlet and an outlet for the fluid, a partition which separates the inlet from the outlet and which includes a cylindrical bore having a circular seat at one end thereof, a valve member that is movable in the axial direction of the circular seat between first and second positions in which the valve is respectively closed and open, and control means functionally connected to said valve member in order to bring it into any desired axial position between its first and second positions so as to regulate the flow of the fluid, said valve member including a first portion which serves as a closure element when the valve member is in its first position, and a second portion which is engaged in said bore and which is shaped to regulate the flow of the fluid at a desired rate depending on the axial position selected for the valve member between its first and second positions.

2. Description of the Prior Art

Known valves described in documents U.S. Pat. No. 3,108,777 and FR-A-2 650 362, for example. In those two documents, the first portion of the moving valve member is substantially in the form of a disk and is connected via a rod to the moving core of an electromagnet serving as control means. When the coil of the electromagnet is not excited, the valve member is held by a return spring in its first position or valve-closed position. In known electrically-controlled valves, the second portion of the valve member is constituted by a part which is a body of revolution about the axis of the rod, e.g. a truncated cone, and which is fixed securely to the first portion of the valve member. Thus, by giving a predefined shape to the generator lines of the surface of revolution which constitutes the outside surface of the second portion of the valve member, it is possible, in principle, to obtain any desired flow/displacement characteristic when the valve member is displaced axially. However, in practice, in order to obtain the desired flow/displacement characteristic in fact, a valve member of that structure requires the axis of the surface of revolution to be accurately centered or aligned with the axis of the circular seat of the valve. This requires high precision when manufacturing the seat and the valve member, when assembling the two elements together, and when guiding the control rod of the valve member, and as a result such a valve is relatively costly.

Furthermore, in certain fields of use, e.g. in the field of gas boilers where valves of the above-mentioned type are used as means for regulating the flow of fuel gas sent to an air/gas mixing chamber preceding the burner of the boiler, in order to modulate the flow as a function of the instantaneous heating power required by the boiler while simultaneously keeping the flow of gas and the flow of air in a predetermined ratio, it is often desirable for the flow of gas to be regulated in a manner that is very fine and smooth, especially in the low-flowrate range, i.e. when the first portion of the moving valve member is in an axial position that is very close to the circular seat of the valve. In other words, in the low-flowrate range, it is desirable that any given axial displacement of the valve member causes only a small variation in the flow of fluid passing through the valve, such that the flow/displacement characteristic of the valve has a shallow slope in the low-flowrate range. In practice, this is difficult to obtain with a known electrically-controlled valve of the above-mentioned type, in which the second portion of the moving valve member has an outside surface in the shape of a truncated cone.

Furthermore, in known electrically-controlled valves of the above-mentioned type, it is usual to excite the electromagnet by means of pure or approximate AC so as to eliminate, at least in part, the magnetic hysteresis that the electromagnet would exhibit if it were to be excited by DC. However, exciting the electromagnet with AC causes the valve member to oscillate, which imparts oscillations into the flow and the pressure of the gas downstream of the electrically-controlled valve. Such oscillations are harmful to the flame of the burner, especially in the low-gasflow range. To avoid such oscillations, it is thus necessary to associate a damper, e.g. a hydraulic damper, with the moving equipment constituted by the electrically-controlled valve member and by the moving core of its electromagnet, as described in the above-mentioned American and French patents. It should also be observed that in the low-flowrate range, when the moving valve member is very close to its circular seat, the oscillations of the valve member can also create noise as a result of the repeated impacts of the valve member on its seat.

That is why the hydraulic damper must be very effective, and as a result it is relatively complex to make. In particular, the radial clearance between the piston and the cylinder of the hydraulic damper must be very small, which requires high mechanical precision in the machining and assembly of the two elements. Furthermore, since the presence of the hydraulic damper greatly reduces the displacement speed of the moving valve member, the electrically-controlled valve has a response time that is long and a check-valve must be provided that is connected hydraulically in parallel with the damper to enable the electrically-controlled valve member to be closed rapidly whenever the electrically-controlled valve is also used as a safety valve. In that case, the safety valve member must be capable of being closed in less than one second.

For all of the reasons mentioned above, electrically-controlled valves of the same type as those described in patent U.S. Pat. No. 3,108,777 and FR-A-2 650 362 are described in patent U.S. Pat. No. 3,108,777 and FR-A-2 650 362 are relatively costly. Furthermore, although the use of pure or approximate AC for exciting the electromagnet enables the magnetic hysteresis of the electromagnet to be eliminated at least in part, it does not eliminate mechanical hysteresis resulting from friction. Since the addition of a hydraulic damper to the electrically-controlled valve has the effect of increasing friction, such a damper thus increases mechanical hysteresis, and the greater the effectiveness of the damper, the greater the mechanical hysteresis it has. Unfortunately, for the same reasons as those described in document FR-A-2 650 362, mechanical hysteresis is a problem when the electrically-controlled valve is used as a regulating element in a temperature regulation loop, since it deteriorates the accuracy of the regulation.

Valves comprising two portions are also known from patents CH 581 284 A (KLEIN SCHANZLIN & BECKER AG), FR 619 503 A (P. PASCALE), and U.S. Pat. No. 4,125,129 A (BAUMANN HANS D). However, the two portions are not detached, but are securely connected to each other.

SUMMARY OF THE INVENTION

Thus, the main object of the present invention is to provide a valve for regulating the flow of a liquid or gaseous fluid, enabling the flow of a liquid or gaseous fluid to be regulated precisely and in accordance with a predefined law as a function of the axial displacement of its moving valve member, without requiring high mechanical precision, such that the valve can be manufactured at a cost that is significantly lower than that of known valves of the same type.

Another object of the present invention is to provide a valve by means of which the flow of fluid can be regulated in a fine and even manner, at least in the low-flowrate range of the flow/displacement of the valve.

An auxiliary object of the present invention is to provide an electrically-controlled valve enabling the flow of a fluid under pressure to be modulated, the valve having a moving valve member that is excited by pure or approximate AC and that is associated with a hydraulic damper, the assembly having little magnetic hysteresis, little mechanical hysteresis, and a better response time, and being simple and cheap to manufacture.

To this end, in the valve of the invention the second portion of the valve member is detached from the first portion of the valve member and has a cylindrical outside surface of diameter such that it is in sliding contact with the cylindrical surface of the bore, at least one recess is formed in the cylindrical outside surface of the second portion of the valve member so as to define a passage having a predefined shape, and means is provided for permanently holding the first and second portions of the valve member in mutual contact so that they are displaced axially simultaneously under the action of the control means.

Thus, as a result of the first and second portions of the valve member being detached from each other, the control rod, which is connected to the first portion of the valve member, no longer needs to be accurately in alignment with the axis of the circular seat, and it thus no longer needs to be mounted and guided in an extremely precise manner. Consequently, manufacture and assembly of the valve is greatly simplified. Since the second portion of the valve member is slidably mounted in the cylindrical bore of the seat, and is in sliding contact with the bore, the second portion of the valve member remains continuously centered and in good alignment on the axis of the circular seat, such that it suffices to give the recess or recesses which is or are formed in the cylindrical outside surface of the second portion of the valve member an appropriate shape in order to obtain the desired flowrate of fluid for each axial position of the second portion of the valve member relative to the circular seat, so as to obtain the desired flow/displacement characteristic.

The passage or passages formed by the above-mentioned recess or recesses preferably has or have a flow section which varies in the axial displacement direction of the valve member so as to obtain the desired flow/displacement characteristic. As can be seen below, the above-mentioned passage or passages can be designed in such a manner that the flow/displacement characteristic obtained presents a shallow slope in the low-flowrate region This is particularly advantageous in the case where the valve is produced in the form of an electrically-controlled valve controlled by an electromagnet that is excited with approximate AC, the electromagnet being associated with a return spring which holds the valve member in its first position in the absence of the electromagnet being excited, and with a hydraulic damper which controls the displacement of the valve member resulting from the electromagnet being excited. In this case, given that a small displacement of the valve member in the low-flowrate range causes the flow rate to vary very little, it becomes possible to tolerate small residual mechanical oscillations of the valve member. Consequently, the hydraulic damper of the electrically-controlled valve of the invention does not need to have a damping power as great as that of prior-art electrically-controlled valves. As a result, the structure of the hydraulic damper can be considerably simplified. In particular, the clearance between the piston and the cylinder of the hydraulic damper can be about 1 mm, whereas it must be $20\mu$ in the damper associated with known electrically-controlled valves. Furthermore, since the valve member is braked less by the hydraulic damper, the response time of the electrically-controlled valve is significantly improved. Furthermore, the electrically-controlled valve can be closed rapidly, in natural manner, under the action of the return spring of the valve member, without it being necessary to mount a check-valve hydraulically in parallel with the hydraulic damper. The valve of the invention is thus well suited for being used also as a safety valve. Finally, the above-mentioned small residual mechanical oscillations give rise, by a trembling effect, to a reduction in friction which, combined with the reduction in the internal friction of the hydraulic damper, almost completely eliminates mechanical hystereis.

In an embodiment of the present invention, the means which enable the first and second portions of the valve member to be held permanently in mutual contact can be constituted by a spring, e.g. a helical spring, which pushes the second portion of the valve member axially against the first portion of said valve member.

In another embodiment of the invention, said holding means can be constituted by a permanent magnet, for example, which is carried by one of the first and second portions of the valve member, the other portion thus being made, at least in part, of a magnetizable material.

BRIEF DESCRIPTION OF THE DRAWINGS

Other characteristics and advantages of the present invention appear better from the following description given with reference to the accompanying drawings, in which.

DETAILED DESCRIPTION OF THE PREFERRED EMBODIMENTS

Figure 1:
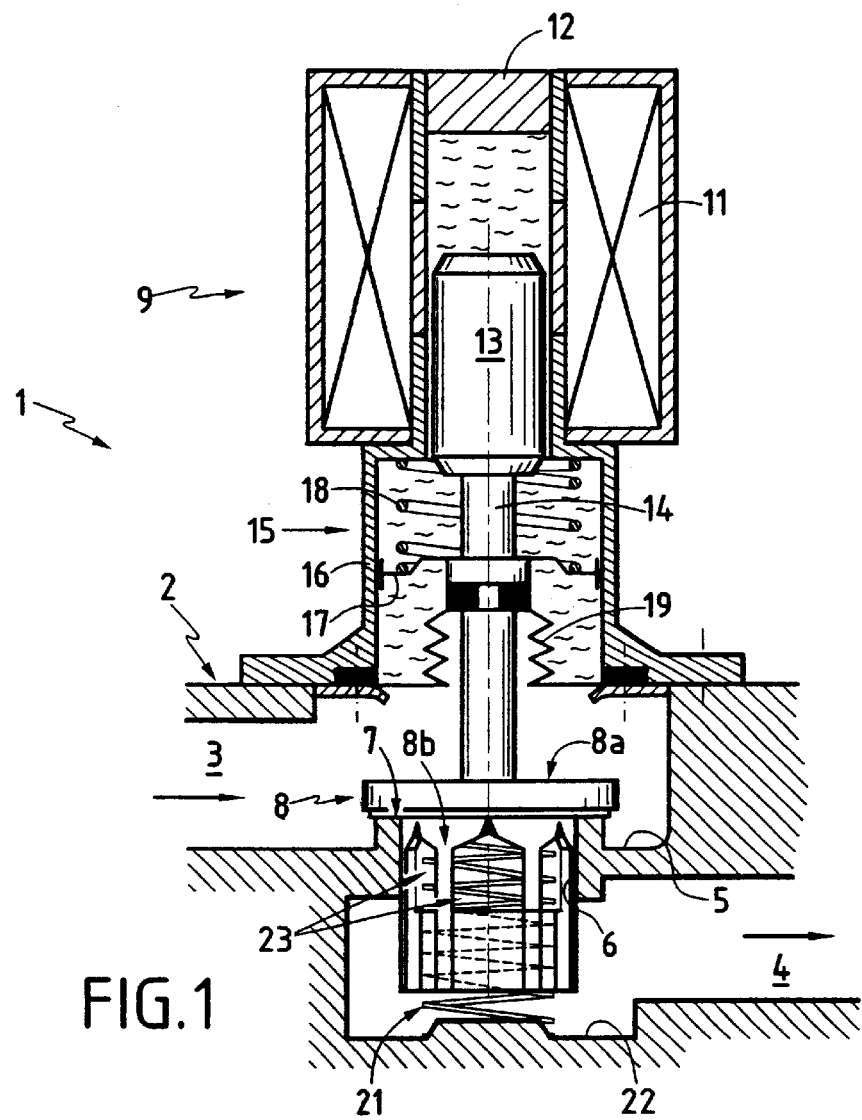
FIG. 1 diagrammatically shows, partially in vertical section and partially in elevation, an electrically-controlled valve constituting a first embodiment of the invention, with a moving valve member composed of two separate portions held in mutual contact.

With reference to FIG. 1, the electrically-controlled valve 1 of the invention generally includes a body 2 having an inlet duct 3 and an outlet duct 4 which is separated from the inlet duct 3 by a partition 5 in which a cylindrical bore 6 is formed. At one of the ends of the bore 6, a circular seat 7 is formed for a moving valve member 8. Control means 9 enables the valve member 8 to be displaced axially, i.e. in the axial direction of the bore 6 and of the circular seat 7, between a first position (shown in FIG. 1) in which the valve 1 is closed, and a second position in which the valve 1 is open. The valve member 8 can be placed in any desired position between its first and second positions by the control means 9.

In the embodiment shown, the control means 9 is constituted by an electromagnet that is essentially composed of a solenoid 11, a fixed magnetic circuit or yoke 12, and a moving core 13 inside the solenoid 11. The yoke 12 and the core 13 form the poles of the electromagnet 9 and they are designed to drive the core 13 with displacement that is proportional to the magnitude of the exciting current as provided by a power supply (not shown). The core 13 is connected to the valve member 8 by a rod 14.

In the case where the exciting power delivers approximate AC, a damper 15 is provided to dampen the oscillations of the valve member 8. The damper 15 is essentially composed of a cylinder 16 which coaxially surrounds the rod 14 and which is filled with oil, and a piston 17 which is carried by the rod 14 and which divides the inside volume of the cylinder 16 into a top chamber and a bottom chamber. A helical spring 18 placed in the top chamber of the cylinder 16 pushes the piston 17 downwards and consequently holds the valve member 8 in sealed contact with the seat 7 in the absence of any exciting current. A sealed bellows 19, which is fixed firstly to the rod 14 and secondly to the bottom end of the cylinder 16, separates the inlet duct 3 from the bottom chamber of the cylinder 16 of the oil-containing damper.

The above-described electrically-controlled valve 1 is entirely conventional and it is not considered useful to describe it in further detail, given that it is possible to refer to patent FR-A-2 650 362 or to patent U.S. Pat. No. 3,108,777, both of which are hereby incorporated by reference in their entirety.

The valve member 8 is composed, in manner known per se, of two portions 8a and 8b. The portion 8a, which can, for example, be constituted by a metal dish, open downwards and containing a sealing gasket made of rubber, for example, serves as a closure element in the sense that, in the absence of the electromagnet being excited, the portion 8a is pressed in leakproof manner against the circular seat 7 so as to close the valve and prevent any fluid from flowing through the bore 6 from the inlet duct 3 to the outlet duct 4. When the electrically-controlled valve 1 is open, i.e. when the portion 8a of the valve member 8 is moved away from the seat 7, the portion 8b of the valve member 8 serves to regulate the flowrate of the fluid which flows towards the outlet duct 4, as a function of the axial position of the valve member 8 relative to the seat 7.

In the valve of the invention, the portion 8b of the valve member 8 is detached from the portion 8a with which it is merely held in contact, e.g. by means of a spring 21 such as a helical compression spring having one end which bears against an internal wall 22 of the body 2 and another end which bears axially against the portion 8b of the valve member 8 in a manner which is described below. Furthermore, in the present invention, the portion 8b of the valve member 8 is in the form of a cylindrical part having a cylindrical outside surface of diameter that is slightly smaller than the inside diameter of the bore 6, such that the cylindrical part constituting the portion 8b of the valve member 8 can slide in the bore 6 with practically no radial play and with no friction.

Thus, it is clear that when the portion 8a of the valve member 8 is moved away from the seat 7 by being displaced upwards by the electromagnet 9, the portion 8b of the valve member 8 is also displaced upwards by the spring 21, thereby remaining in contact with the portion 8a of the valve member. Conversely, when the portion 8a of the valve member is lowered in the direction of the seat 7, it pushes the portion 8b of the valve member downwards, thereby compressing the spring 21. It can thus be seen that the two portions 8a and 8b of the valve member can be displaced axially simultaneously and by the same amount under the combined action of the electromagnet 9 and of the spring 21. It can also be seen that it is not necessary for the rod 14 to be accurately in alignment with the axis of the circular seat 7 or with the axis of the cylindrical part constituting the portion 8b of the valve member in order for the system to function correctly.

At least one recess 23 is formed in the cylindrical outside surface of the part constituting the portion 8b of the valve member 8. The recess 23 is formed so as to define a passage having a predefined shape so that a flow of fluid is obtained having a flowrate that is predetermined as a function of the axial position of the valve member 8 relative to the seat 7.

Figure 2:
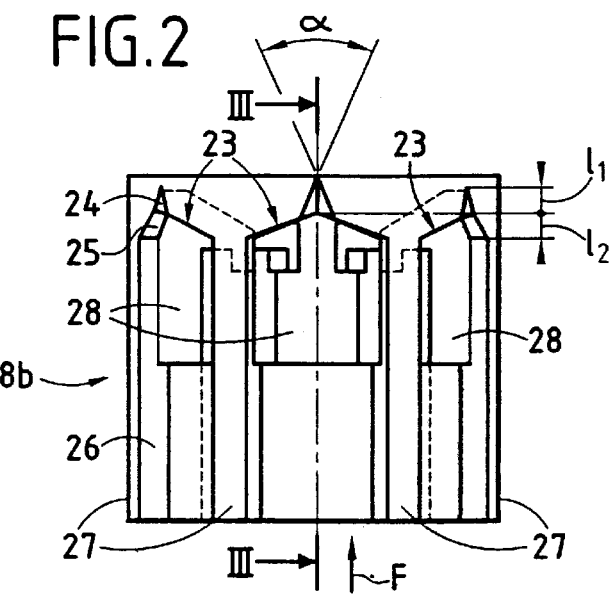
FIG. 2 shows, on larger scale and in elevation, one of the two portions of the valve member of FIG. 1.
Figure 3:
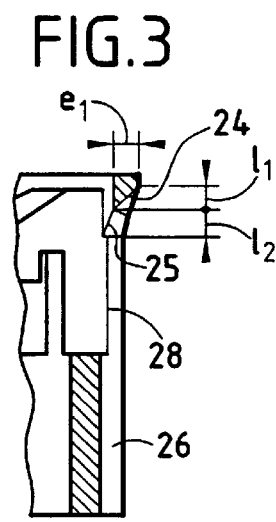
FIG. 3 is a fragmentary view in vertical section on line III—III of FIG. 2.
Figure 4:
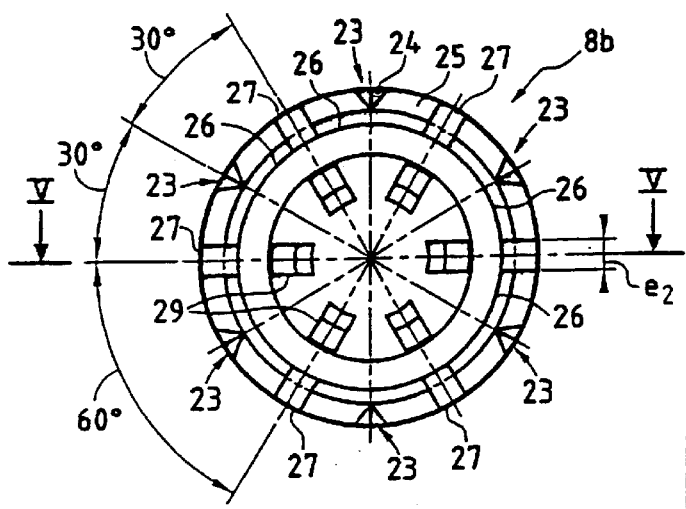
FIG. 4 is a view along arrow F of FIG. 2.
Figure 5:
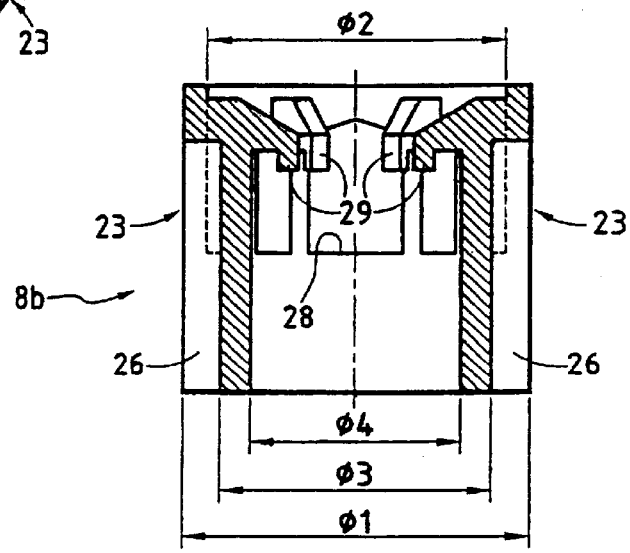
FIG. 5 is a section view on line V—V of FIG. 4.

FIGS. 2 to 5 show a first embodiment of the cylindrical part constituting the portion 8b of the valve member 8. The part 8b shown in FIGS. 2 to 5 is essentially constituted by a hollow cylindrical element which includes a plurality of longitudinal slots or notches 23, e.g. six notches 23, which are uniformly distributed angularly over its peripheral surface. More precisely, as is visible more particularly in FIGS. 2 to 4, each notch 23 can include three successive portions 24, 25, and 26 following on from one another from the top end of the part 8b of the valve member 8 to the bottom end thereof. The top portion 24 of the notch 23, which has an axial length $l_1$, has a width which increases relatively slowly from the top end of the part 8b downwards, i.e. seen from the outside, the top portion 24 of the notch 23 is an upsidedown V-shape with an acute angle. The cross-section of the portion 24 of the notch 23 is also V-shaped and open towards the outside of the portion 8b, as shown in FIG. 4. Furthermore, the portion 24 of the notch 23 has a depth which increases from a zero value, substantially at the top end of the part 8b, to a predetermined value $e_1$ in the region where the portion 25 of the notch 23 begins, as shown in FIG. 3. The portion 25 of the notch 23, which has an axial length $l_2$, has a width which increases significantly faster than that of the portion 24. In other words, seen from the outside of the part 8b, the portion 24 has a relatively pointed roof shape (acute angle α), while the portion 25 has a relatively flat roof shape. Finally, the third portion 26 of the notch 23, which can extend over the remaining length of the part 8b, has a constant width and a constant depth over its entire length. As shown in FIG. 4, the bases of the portions 26 of all the notches 23 are formed by cylindrical surfaces and the portions 26 of the notches 23 are separated from one another by longitudinal ribs 27 having constant width $e_2$. A wide opening 28 is formed in the base of the portion 25 and in the top portion of the base of the portion 26 of each notch 23, as shown in FIGS. 2, 3, and 5.

As shown in FIGS. 4 and 5, a plurality of hook-shaped tabs 29, e.g. six tabs 29, project radially over the inside cylindrical surface of the cylindrical part 8b. The tabs 29 together form both abutment means and centering means for the top end of the spring 21 which pushes the portion 8b of the valve member 8 into contact with the portion 8a of said valve member.

By way of example, in the case where the bore 6 has an inside diameter of 13 mm, the dimensions Ø1, Ø2, Ø3, Ø4, $l_1$, $l_2$, $e_1$, $e_2$, and α can have the following values:

| | |
|---|---|
| φ1 ≈ 12.9 mm | |
| φ2 = 11 mm | $l_1$ = 1 mm |
| φ3 = 10 mm | $l_2$ = 1 mm |
| φ4 = 8 mm | $e_1$ = 2 mm |
| α = 60° | $e_2$ = 1 mm |

Figure 6:
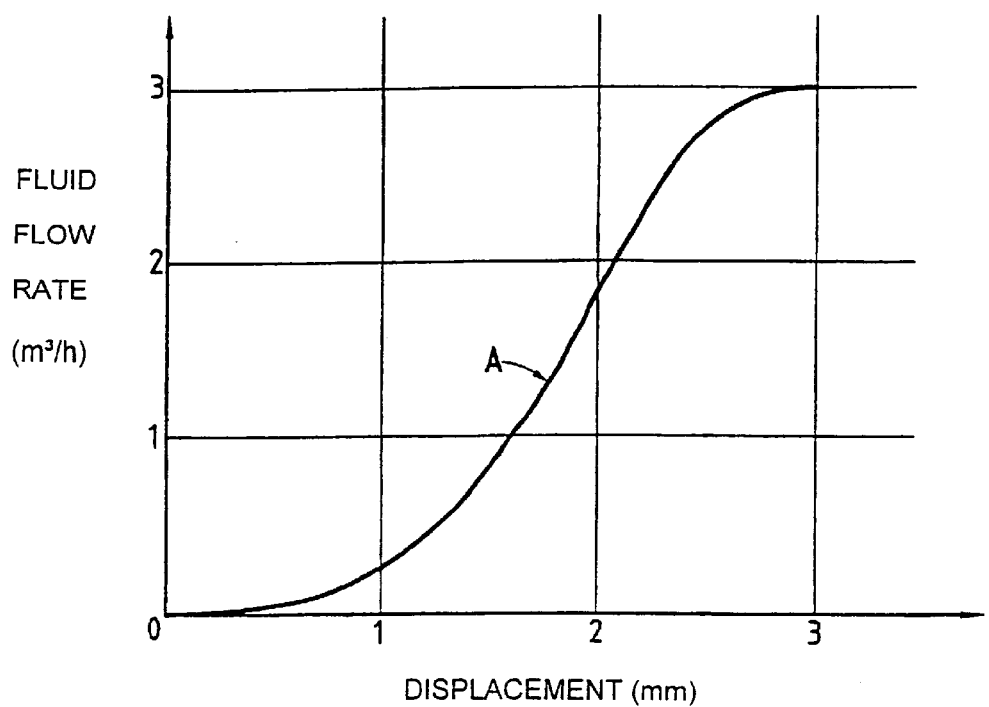
FIG. 6 is a graph showing the flow/displacement characteristic of the electrically-controlled valve of FIG. 1.

In FIG. 6, curve A shows the flow/displacement characteristic obtained with the electrically-controlled valve of FIGS. 1 to 5, whose part 8b has the dimensions indicated above, when the electrically-controlled valve is fed with gas and when its valve member 8 is displaced by the electromagnet 9 from the position shown in FIG. 1, in which the electrically-controlled valve is closed, to a position in which the portion 8a of the valve member 8 is moved away from the seat 7 by three millimeters. As can be seen in FIG. 6, when the portion 8a of the valve member 8 is still very close to the seat 7 (less than 1 mm), i.e. in the low-flowrate range, the flowrate of the gas varies very little with displacement of the valve member. This is particularly favorable in the case of an electrically-controlled valve modulating the flow of gas sent to the burner of a boiler, since the flame of the burner can remain stable even if the electromagnet 9 of the electrically-controlled valve is powered with AC.

Figure 7:
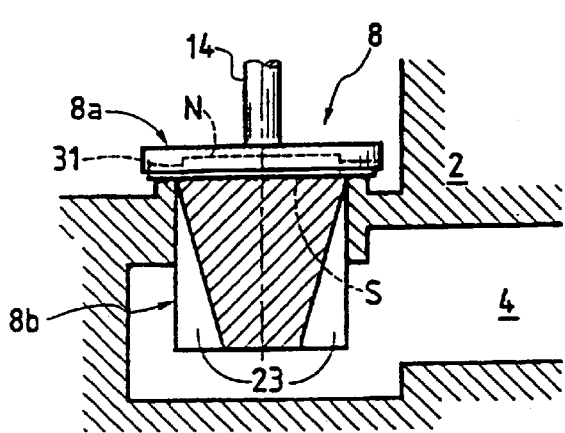
FIG. 7 is a fragmentary view of a valve constituting a second embodiment of the present invention.
Figure 8:
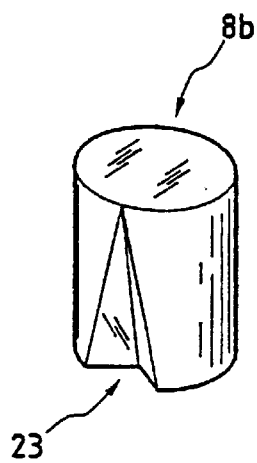
FIG. 8 is a perspective view showing one of the two portions of the moving valve member of the valve of FIG. 7.
Figure 9:
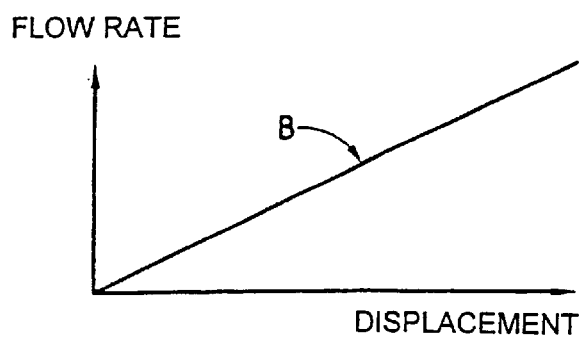
FIG. 9 is a graph showing the flow/displacement characteristic of the valve of FIG. 7.

FIGS. 7 and 8 show another embodiment of the invention, in which the portion 8b of the valve member 8 is, in this case, constituted by a solid cylindrical element including two longitudinal recesses or grooves 23 formed in diametrically opposite positions in its outside peripheral surface. In this case, each longitudinal groove 23 has a V-shaped cross-section over the entire length of the portion 8b of the valve member, with a depth which increases linearly from a zero value to a predefined value from the top end to the bottom end of the cylindrical part 8b (FIG. 7). With such a cylindrical part 8b, a flow/displacement characteristic B is obtained which is linear, as shown in FIG. 9.

In addition, in the embodiment in FIG. 7, instead of using a spring as means for holding the portion 8b of the valve member 8 in contact with the portion 8a of said valve member, in this case, a permanent magnet 31 is used. The magnet 31 can, for example, be in the form of a disk which is carried by the portion 8a of the valve member 8. In this case, the portion 8b must be made, at least in part, of a magnetizable material. Naturally, it is also possible to have the reverse arrangement. For example, the permanent magnet could be constituted by a magnetic bar embedded in the central position in the portion 8b of the valve member, the portion 8a of said valve member thus being made of a magnetizable material in its central portion.

Figure 10:
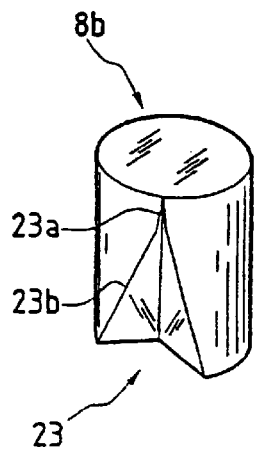
FIG. 10 is a perspective view similar to FIG. 8 showing a variant.
Figure 11:
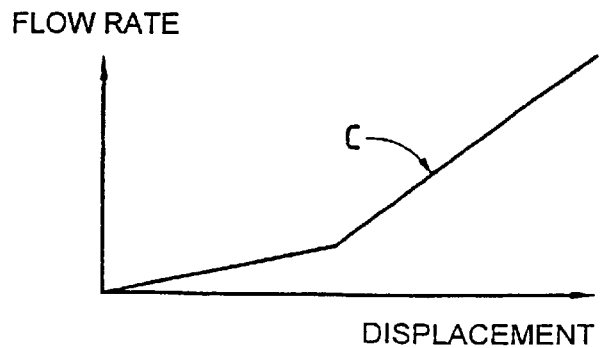
FIG. 11 is a graph showing the flow/displacement characteristic of the valve of FIG. 7 in the case where it is fitted with a moving valve member having a portion as shown in FIG. 10.

The portion 8b of the valve member shown in FIG. 10 has, like that shown in FIG. 8, two longitudinal recesses or grooves 23 formed in diametrically opposite positions in its peripheral surface, each groove 23 having a V-shaped cross-section. However, in the portion 8b of FIG. 10, each groove 23 has, in its top portion 23a, a width which increases linearly at a slower rate than in the bottom portion 23b of the groove 23, such that a flow/displacement characteristic is obtained having the form shown by Curve C in FIG. 11.

Figure 12:
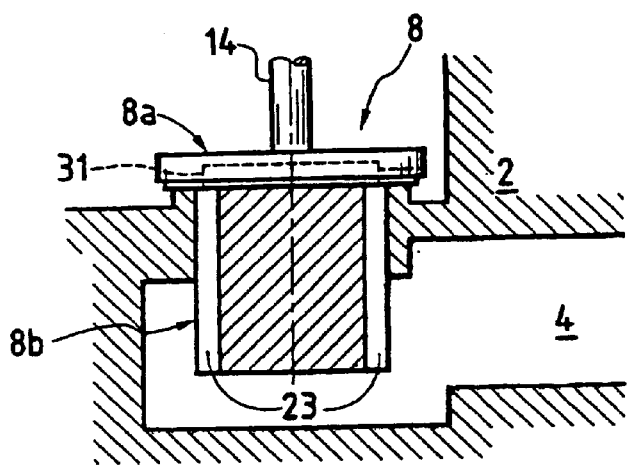
FIG. 12 is a view similar to FIG. 7 showing yet another embodiment of the present invention.
Figure 13:
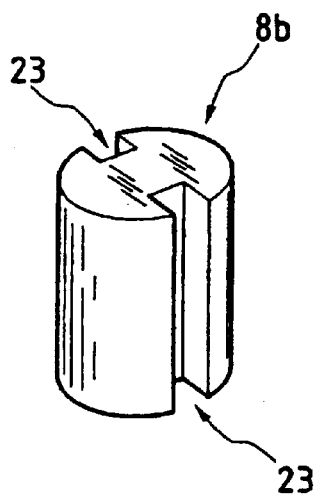
FIG. 13 is a perspective view similar to FIGS. 8 and 10 showing one of the two portions of the valve member of the valve shown in part in FIG. 12.
Figure 14:
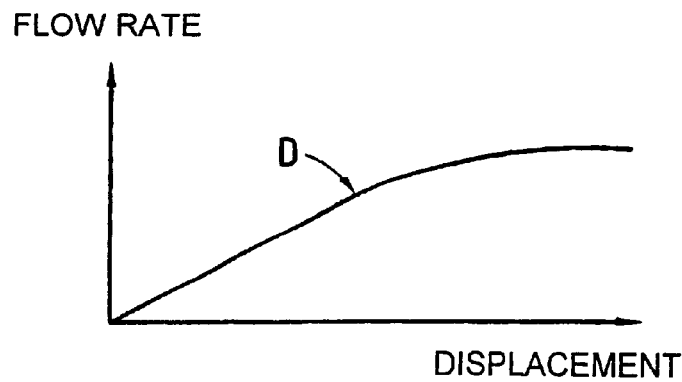
FIG. 14 is a graph showing the flow/displacement characteristic of the valve shown in FIG. 12.

In the embodiment shown in FIGS. 12 and 13, the portion 8b of the valve member 8 is again made in the form of a solid cylindrical part which is held in contact with the portion 8a of the valve member by a permanent magnet 31. In this embodiment, the portion 8b of the valve member differs from those which are shown in FIGS. 8 and 10 in that, in this case, each of the two longitudinal grooves 23 has a width and a depth which are constant over the entire length of the portion 8b. A flow/displacement characteristic is thus obtained having the form shown by Curve D in FIG. 14.

Naturally, the above-described embodiments of the present invention are given purely by way of non-limiting, indicative example, and numerous modifications can easily be brought thereto by the person skilled in the art, without going beyond the ambit of the invention. In particular, the flow direction of the fluid inside the electrically-controlled valve 1 could be the opposite to that shown, the duct 4 thus being the inlet duct and the duct 3 the outlet duct. Furthermore, the hydraulic damper 15 can be replaced by a pneumatic damper. Furthermore, instead of using an electromagnet to control the valve member 8 of the valve, other linear actuators could be used, e.g. an worm-screw and nut system driven by a reversible electric motor, or even any other control means, including purely mechanical means, capable of producing linear displacement of the valve member 8. The present invention is applicable to any type of valve whose valve member is axially movable relative to a circular seat as soon as it is desired to obtain a predefined flow/displacement characteristic, with high precision, without it being necessary for the valve member 8 and its control rod 14 to be centered perfectly relative to the axis of the seat 7.

What is claimed is:

1. A valve for regulating the flow of a liquid or gaseous fluid, the valve comprising:

a body having an inlet and an outlet for the fluid;

a partition which separates the inlet from the outlet and which includes a cylindrical bore having a circular seat at one end thereof;

a valve member that is movable in the axial direction of the circular seat between first and second positions in which the valve is respectively closed and open; and control means functionally connected to said valve member in order to bring it into any desired axial position between its first and second positions so as to regulate the flow of the fluid, said valve member including a first portion which serves as a closure element when the valve member is in its first position, and a second portion which is engaged in said bore and which is shaped to regulate the flow of the fluid at a desired rate depending on the axial position selected for the valve member between its first and second positions, wherein the second portion of the valve member is detached from the first portion of the valve member and the second portion has a cylindrical outside surface diameter such that the second portion of the valve member is in sliding contact without friction with the cylindrical surface of said bore, and the second portion of the valve member includes means for bringing the first and second portions of the valve member closer together so as to produce a simple mutual contact and to hold the contact permanently so that the first portion of the valve member and the second portion of the valve member are displaced axially simultaneously and by the same amount under the action of the control means.

2. The valve as claimed in claim 1, wherein the first portion of the valve member is functionally connected to the control means, and wherein the means which holds the first and second portions of the valve member in mutual contact is constituted by a spring which pushes the second portion of the valve member axially against the first portion of the valve member.

3. The valve as claimed in claim 1, wherein the first portion of the valve member is functionally connected to the control means, and wherein the means which holds the first and second portions of the valve member in mutual contact is constituted by a permanent magnet which is carried by one of the first and second portions of the valve member, the other portion being made, at least in part, of a magnetizable material.

4. The valve as claimed in claim 1, wherein the control means comprises an electromagnet that is excited by approximate AC and including a moving core that is connected via a rod to the valve member of the valve, the electromagnet being associated with a return spring which holds the valve member in its first position in the absence of the electromagnet being excited, and with a hydraulic damper which controls the displacement of the valve member resulting from the electromagnet being excited.

5. The valve as claimed in claim 1, wherein the second portion of the valve member includes at least one recess formed in the cylindrical outside surface of the second portion of the valve member so as to define a passage having a predefined shape.

6. The valve as claimed in claim 5, wherein the passage has a flow section which varies in said axial direction.

7. The valve as claimed in claim 6, wherein the second portion of the valve member is constituted by a hollow cylindrical element having a peripheral wall which includes, by way of varying-section passage, at least one longitudinal slot or notch which has a varying width in the longitudinal direction of the hollow cylindrical element.

8. The valve as claimed in claim 6, wherein the second portion of the valve member is constituted by a cylindrical element, the cylindrical outside surface of which is formed, with a varying-section passage having at least one longitudinal groove having a width and depth which varies in the longitudinal direction of the cylindrical element.

9. The valve as claimed in claim 6, wherein the second portion of the valve member is constituted by a cylindrical element, the cylindrical outside surface of which is formed, with a varying-section passage having at least one longitudinal groove having a width which varies in the longitudinal direction of the cylindrical element.

10. The valve as claimed in claim 6, wherein the second portion of the valve member is constituted by a cylindrical element, the cylindrical outside surface of which is formed, with a varying-section passage having at least one longitudinal groove having a depth which varies in the longitudinal direction of the cylindrical element.

* * * * *